United States Patent [19]

Galarnyk

[11] Patent Number: 5,427,469

[45] Date of Patent: Jun. 27, 1995

[54] CABLE RESTRAINING DEVICE

[76] Inventor: Timothy G. Galarnyk, 3800 Silver Spring Dr., Eau Claire, Wis. 54701

[21] Appl. No.: 77,233

[22] Filed: Jun. 14, 1993

[51] Int. Cl.[6] .......................... F16G 11/00; F16B 7/04
[52] U.S. Cl. ..................................... 403/396; 403/306; 403/312; 24/122.6; 24/135 K; 24/135 L
[58] Field of Search ............... 403/300, 306, 312, 391, 403/396; 24/122.6, 135 R, 135 N, 135 A, 135 K, 135 L, 277; 248/59, 63

[56] References Cited

U.S. PATENT DOCUMENTS

| | | | |
|---|---|---|---|
| 84,827 | 12/1868 | Hulett . | |
| 982,792 | 1/1911 | Piper | 24/135 A |
| 1,078,605 | 11/1913 | Blackburn . | |
| 1,252,711 | 1/1918 | Mathias | 248/63 |
| 1,341,438 | 5/1920 | Pope . | |
| 1,592,615 | 7/1926 | Neveau . | |
| 1,940,263 | 12/1933 | McLaughlin | 24/135 L |
| 2,189,671 | 2/1940 | Mardis . | |
| 2,540,426 | 2/1951 | Campbell . | |
| 3,004,317 | 10/1961 | Page . | |
| 3,905,711 | 9/1975 | Rogers . | |
| 4,561,154 | 12/1985 | Briscoe . | |
| 4,602,891 | 7/1986 | McBride . | |
| 4,718,788 | 1/1988 | Briscoe et al. . | |
| 4,809,408 | 3/1989 | Abrahamson . | |

FOREIGN PATENT DOCUMENTS

| | | |
|---|---|---|
| 306577 | 11/1917 | Germany . |
| 450994 | 7/1936 | United Kingdom . |
| 456358 | 11/1936 | United Kingdom . |

OTHER PUBLICATIONS

R. DeBenedictis, *Bob's Rigging and Crane Handbook*, 1989.

*Primary Examiner*—Richard A. Bertsch
*Assistant Examiner*—William J. Wicker

[57] ABSTRACT

The present invention provides for a cable or rope restraining device which comprises a U-shaped member or U-bolt to engage two saddle clamps. The first saddle clamp is a friction clamp for securing a dead end section of the rope. The second saddle clamp provides a channel for loosely containing a live section of the rope.

12 Claims, 3 Drawing Sheets

CABLE RESTRAINING DEVICE

FIELD OF THE INVENTION

The device described in this application relates to a clamping apparatus for securing a flexible cable. More particularly, the present invention is directed to a device that may be attached to a wire rope in a predetermined position consisting of a structure to prevent fatigue and failure of both the dead end section and live section of a wire rope.

DESCRIPTION OF PRIOR ART

Heavy earthmoving equipment, such as drag line excavators and cranes use a large diameter cable. For purposes of the present invention, the term "cable" includes, but is not limited to a flexible rope or wire or chain. Preferably, the cable is a wire rope consisting of a length of several intertwined smaller diameter wires. The cable referred to herein can vary in size from approximately ⅛ inch in diameter to as much as 3 inches in diameter and is relatively stiff and quite heavy.

The difficulties of connecting cable to cranes has necessitated the use of heavy cast metal sockets and wedges, known to the art, which pinch the cable to prevent slippage. The act of attaching a socket to the cable requires that the leading end of the cable be positioned through the socket and tightly clamped, pinching the cable.

Unfortunately, a wedge socket is only about 80% efficient in restricting cable movement. Care must be to prevent moving loads from forcing the cable out of the wedge, and to prevent accidental slackening of the cables thereby releasing the socket and allowing the cable to slip.

To prevent this from happening, the cable must be positively locked onto the wedge socket. Additionally, the dead or short end of the cable should either have a clip attached to it or be looped back and secured to itself by a clip. The loop formed must not be allowed to enter the wedge.

Typically, the prior art dead end of the cable is not attached to the live side of the line with the clip for fear of weakening the attachment. In this mode the clip could ultimately take the load and may deform and break the cable.

A most common method used for containing the dead end of a cable to a piece of equipment is with a clamping device or clip of the U-bolt and saddle type. These devices have the advantages of allowing easy examination and field installation. Currently, clips are made of drop-forged steel since malleable iron clips will bend and break.

In the prior art it was recommended that the dead end of the cable should have a clip attached to it. However, it was also recommended that the dead end of the cable not be attached to the live side of the cable with the cable clip because the clip will ultimately take the load and could deform and break the cable.

The prior art has utilized three methods to secure the dead end. The first method is by placement of a standard rope clamp securing the dead end directly to the live end. This method does not allow the live end to properly rotate and move vertically. Because of this defect, the cable routinely creates a transfer of the entire load to the dead end of the cable when the wedge slips causing a bend in the live section. Such a bend eventually weakens the live section of rope allowing a break. Second, a short piece of cable or rope is secured to the dead end with a standard clamp. The dead end remains unsecured, allowing it to move about freely. However, the movement of the dead end causes metal fatigue failure at the base of the dead end where it comes into contact with the wedge socket. The dead end could subsequently break off and become airborne, posing serious danger to people and property. Third, a loop is made in the dead end and the end is secured to itself with a standard rope clamp. The same problems as described in the second method above occur with this type of device. Additionally, the loop which is created by the dead end frequently gets caught on other rigging or equipment.

A disadvantage of the prior art cable clips when used in combination with wedge sockets is that they pinch the working section of cable with the free section of cable. Since the working section of cable is pinched it is not allowed to turn freely within the cable clip. This lack of freedom to turn will eventually cause wear and damage to the working cable section, reducing its lifetime or even causing it to break.

A further disadvantage is that the prior art cable clip could not be used to measure the slippage of a wedge socket over time. In the prior art devices, since the cable clips are pinching the working section of wire with the dead end section of wire, slippage may not easily be detected because the cable clip will not move in relation to the wedge socket.

SUMMARY OF THE INVENTION

The double saddle clamp of the present invention was designed to firmly secure a dead end of a cable or wire rope above a wedge socket, thereby preventing fatigue to the base of the dead end section, avoiding pinching the live section, and further preventing the cable from being pulled through the wedge socket when the live section is under a heavy load and the wedge socket slips. The double saddle clamp secures the dead end by loosely connecting the clamp to the "live" or long end of the cable allowing it to remain vertically flexible, while the "dead" or short end section is tightly clamped.

Distinguishing features and advantages over the prior art include: (1) a small number of component parts (5 pieces); (2) one individual clamp to secure the dead end to the live end; (3) easier application; (4) more compact than the prior art, i.e., can be applied in restricted space; the double saddle clamp cannot compress the live end of the cable, which may cause live line failure; and there is no need to connect two clamps.

A device has been designed that overcomes the disadvantages of prior cable clips. The double saddle clamp of the present invention is made to allow the live section of the cable to freely pass through one portion of the cable clip. The live section cable portion is allowed to freely rotate and move in either linear direction up or down when the cable clip is attached. The live section of the clamp of the present invention is loosely attached to the live section of the rope in order to prevent any stress to the live section; yet it contains the free swinging movement of the dead end section of the cable by attaching it to the live section of the cable.

A further advantage of the present invention is that the portion of the cable clip that is attached to the dead end section of the rope is secured tightly to prevent any linear movement or twisting of the dead end section.

The dead end section is attached to the live section of the rope. If the wedge socket should allow rope slippage, the linear movement of the rope will be shown by the lessening distance between the wedge socket and the double saddle clamp cable clip. The cable clip could eventually carry the load of the live section of the rope when it comes in contact with the wedge socket. However, detection of cable movement and slippage will present itself before the double saddle clamp cable clip rests against the wedge socket and bears the load.

Even if the cable clip were to ultimately carry the load of the cable, it would not damage the cable as a prior art device would. The dead end section of the cable, which is securely squeezed within the dead end portion of the cable clip, would bear against the wedge socket taking the load, and allow the live section of the cable to freely extend to the crane boom.

The present invention provides for a cable restraining device which comprises a U-shaped member or U-bolt to engage a double saddle clamp member. The first saddle clamp is a friction clamp for engaging a dead end section of the cable. The second saddle clamp provides a channel for loosely containing a live section of the cable. The second saddle clamp also engages the U-bolt and has four legs for registering with the first saddle clamp. At least one fastener is attached to the U-shaped bolt which provides a gripping force to the second saddle clamp, thereby transferring the force to the first saddle clamp creating friction on the wire rope. The second saddle clamp encompasses the cable providing lateral and rotational movement for a live section of the wire rope. The first saddle clamp frictionally clamps the dead end section of a wire rope against the U-shaped bolt. The first saddle clamp does not provide either lateral or rotational movement of the dead end section of the rope. Each of the saddle clamps provides for two apertures which slip over the two legs of the U-bolt and threaded nuts, used as fasteners, secure each saddle clamp to the U-bolt. The threaded nuts further provide the required force to clamp the dead end section of the cable preventing movement.

References is now made in detail to the preferred embodiments of the invention, examples of which are illustrated in the accompanying drawings.

DETAILED DESCRIPTION OF THE INVENTION

In the preferred embodiment illustrated, the double saddle clamp is used to secure and contain the end portion, more commonly known as the dead end, of a wire rope also known as a wire cable. The live portion of the rope is allowed to move freely, both vertically and rotationally within the double saddle clamp. The dead end must be restrained from whipping about which causes extreme fatigue, wear, abrasion and allows the end to fray more quickly creating an unusable and dangerous rope. It is important that the working or live end section of the cable remain free from containment or restraint in order to allow the live section to freely twist and remain elastic without impediment thus preventing cable fatigue and failure, i.e., shearing the cable at the clamp site.

Figure 1:
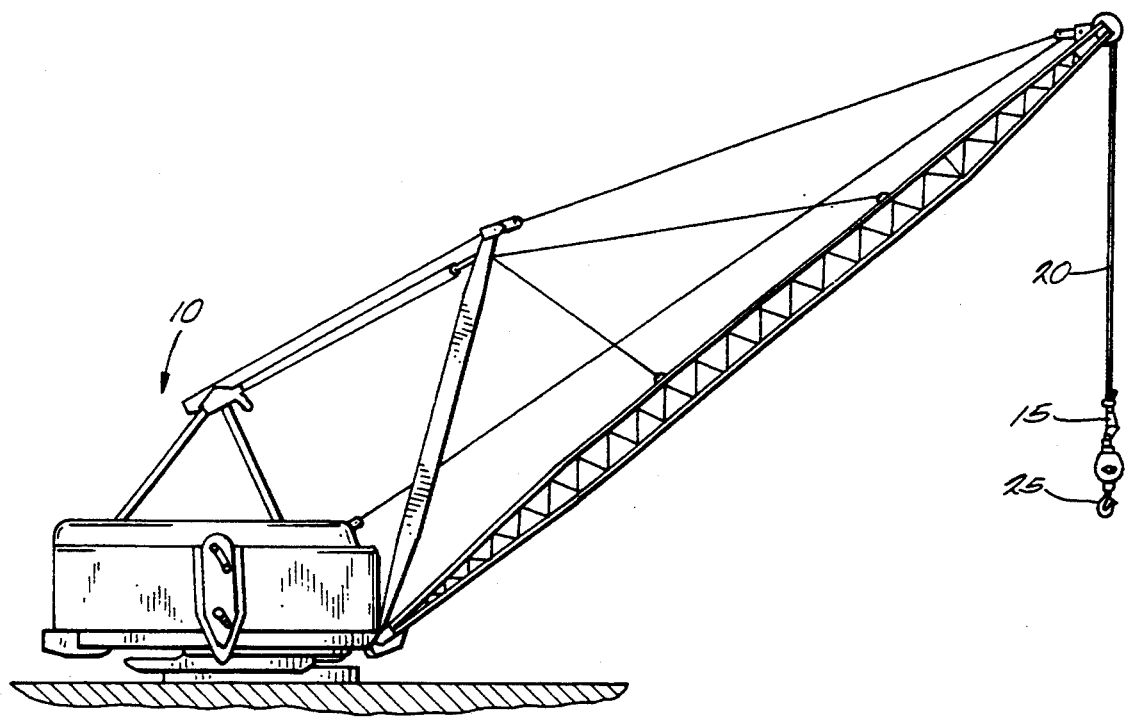
FIG. 1 is a side elevational view of a large crane showing the device attached to the cable above the hook and wedge socket.
Figure 2:
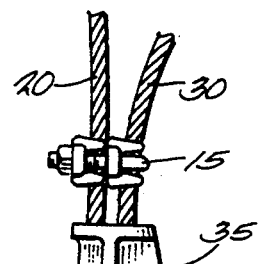
FIG. 2 is a side elevation magnification of the hook wedge socket and double saddle clamp.
Figure 2:
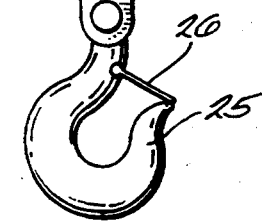

In FIG. 1, a large crane 10 is shown utilizing the double saddle clamp 15 attached to a wire rope 20 which is connected to the crane 10 for raising and lowering a hook 25, preferably a safety hook having a safety tab 26, attached to the wire rope 20 depicted in FIG. 1. FIG. 2 shows the double saddle clamp 15 attached to the dead end 30 of the wire rope 20. Below the double saddle clamp 15 is a wedge socket 35, known to the art for securing the wire rope 20 from movement. The hook 25 is shown extending downwardly from the wedge socket 35.

Figure 3:
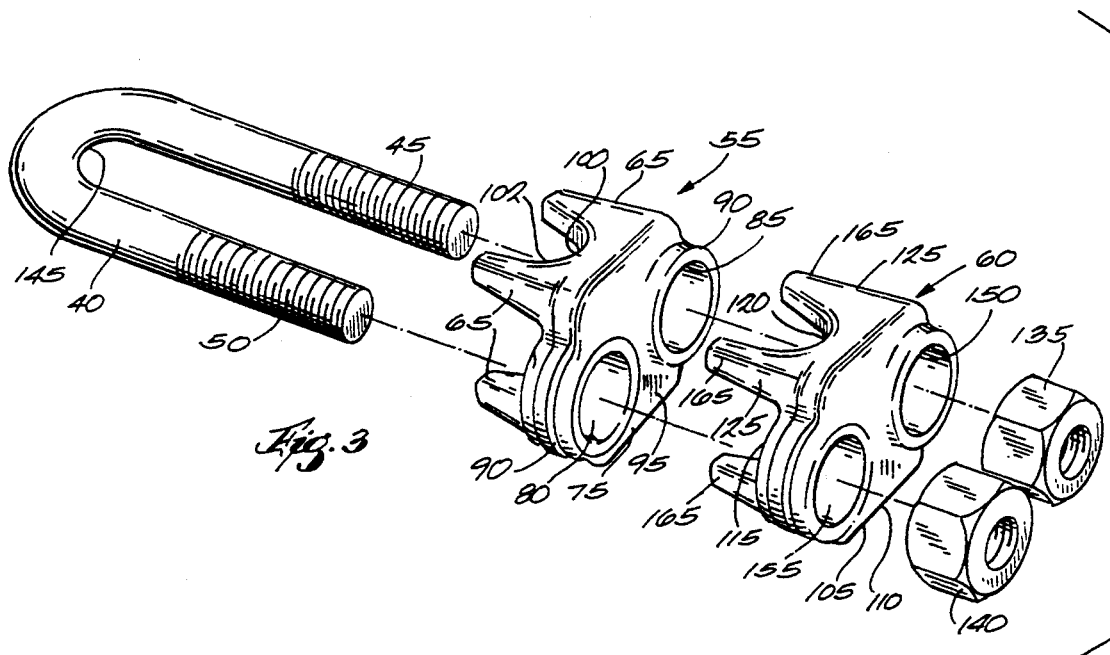
FIG. 3 is an exploded perspective view of the double saddle clamp showing the U-bolt, two saddles, and two nuts.
Figure 5:
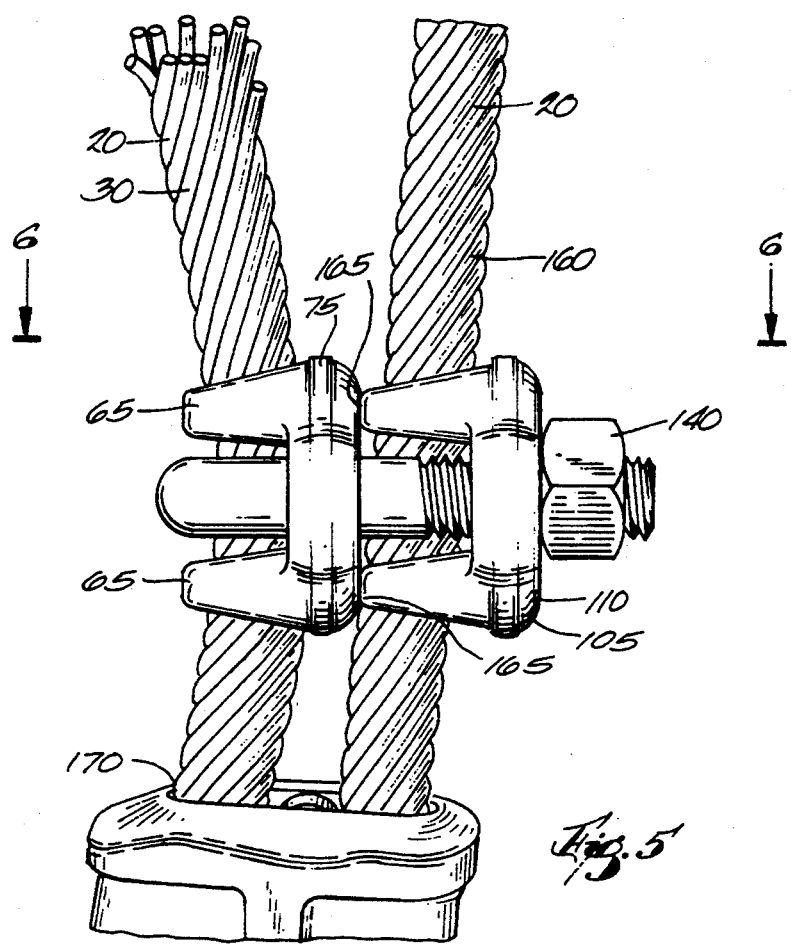
FIG. 5 is a side elevation view of the double saddle clamp in working position above the wedge socket.
Figure 6:
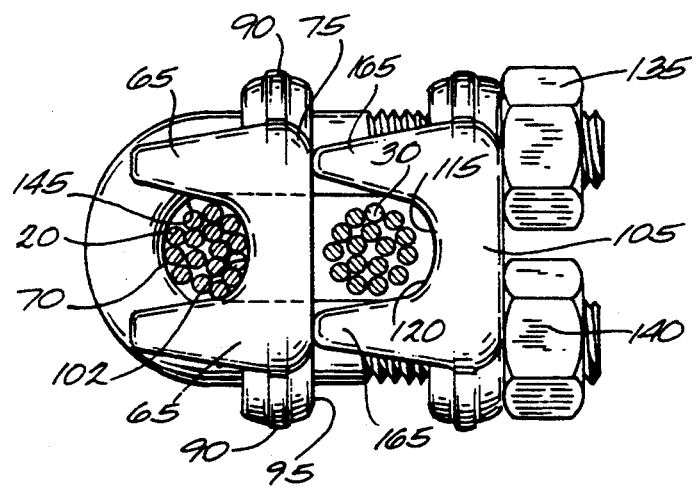
FIG. 6 is a top cross-sectional view through a portion of the cable along line 6—6 of the FIG. 5 showing the cable dead end tightly clamped and the cable live section loosely fitted.

FIG. 3, depicting the exploded view of the double saddle clamp 15, illustrates the various pieces of the device. A U-bolt 40 is shown with a threaded first end 45 and a threaded second end 50. First saddle 55 is shown with legs 65 extending outwardly. Each of the four legs 65 defines a first passageway 70, shown in FIG. 6. The first passageway 70 is U-shaped to conform to the shape of the wire rope 20 in the working position. The legs 65 extend away from a body 75 as shown in FIGS. 3, 5 and 6. The body 75 defines a first aperture 80 and a second aperture 85 located at opposite ends 90 of the body 75.

In the preferred embodiment the first aperture 80 and the second aperture 85 are circular in shape and are sized slightly larger than threaded ends 45 and 50 to allow their passage therethrough. The body 75 is substantially rectangular with ends 90 slightly bulging outwardly opposite each other. The body 75 and legs 65 are contiguous and are made of hardened forged steel in the preferred embodiment. Other materials are of course contemplated. First outer side 95, shown in FIG. 3, provides a relatively flat surface for contact with and support of the second saddle 60 in the working position. The second inner side 100 provides a curved shape to contour to the wire rope 20 as it is held therein. The second side surface 100 defines small striations (not shown) to further frictionally engage the wire rope 20.

The second saddle 60, as shown in FIGS. 3-6, is physically identical to the first saddle 55, in the preferred embodiment. Functionally, however, the second saddle 60 differs from the first saddle 55, in that, the second saddle 60 has a body 105 comprising a first side 110 and a second side 115, as shown in FIG. 6, having a contoured surface 120 which, along with legs 125 (FIG. 3) provide a second passageway 130 (FIG. 6) to accept the wire rope 20 therethrough. The second saddle 60 provides a different function than the first saddle 55. The wire rope 20 which passes through the second passageway 130 in the operating position, is not tightly secured, but is simply contained and allowed to slip freely in a vertical direction or rotate circumferentially or stretch and retract. This movement is free movement which is meant to prevent the wire rope 20 from wearing quickly and to cause less fatigue and abrasion. If the wire rope 20 were to be clamped securely, as in the prior art devices, not allowing free movement, the wire rope 20 would require replacement much more quickly.

Figure 4:
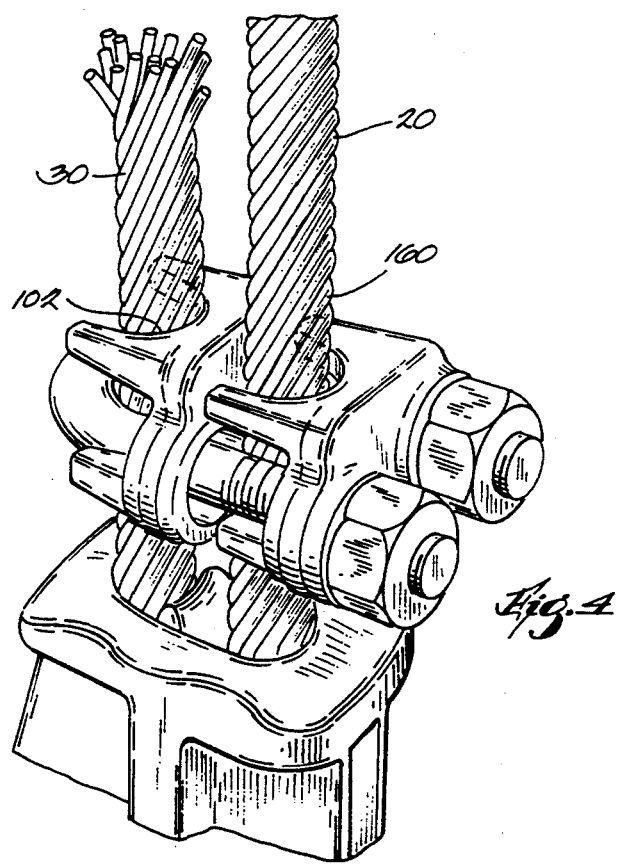
FIG. 4 is a magnified perspective view of the double saddle clamp attached to the dead end section of cable and loosely attached to the live section of cable.

A first fastener 135 (FIG. 3) attaches to the threaded first end 45. A second fastener 140 attaches to the threaded second end 50 as shown in FIG. 3, 4 and 6. The fasteners 135 and 140 are in the form of hexagonal threaded nuts of the standard variety fitted to the threaded ends 45 and 50.

In the working position of the preferred embodiment, the U-bolt 40 is positioned such that the dead end 30 of the wire rope 20 (FIGS. 4 and 5) is snugly fit adjacent U-shaped end 145 (FIGS. 3 and 6) a few inches above the wedge socket 35. The first saddle 55 is then slipped onto the U-bolt 40 with the first aperture 80 encompassing the threaded first end 45 and the second aperture 85 encompassing the threaded second end 50, and further slipped toward U-shaped end 45 such that the surface 102 is fitted snugly around the wire rope 20 compressing it against the U-shaped end 145 such that the U-shaped end 145 and the surface 102 frictionally engage the wire rope 20. The second saddle 60 is then slipped on the U-bolt 40 such that the first orifice 150 (FIG. 3) slides over and around the threaded first end 45 and a second orifice 155 slides over and around the threaded second end 50 of the U-bolt 40. The second saddle 60 must be positioned such that it encompasses the live section 160 of the wire rope 20 as shown in FIG. 4. The second saddle 60 is slid onto the U-bolt 40 until the leg ends 165 contact and engage the first side 95 of the first saddle 55. As shown in FIGS. 4 and 6, the legs 125 and second side 115 form a contour surface 120.

The first fastener 135 is then mounted onto the threaded first end 45 of the U-bolt 40. Similarly, the second fastener 140 is mounted onto the second threaded end 50 of the U-bolt 40 as shown in FIGS. 4 and 6. The fasteners 135 and 140 are then tightened to frictionally engage the surface 102 and the U-shaped end 145 with the dead end 30 of the wire rope 20. The fasteners 135 and 140 are tightened to prevent any movement, laterally or rotationally of the dead end 30.

As the fasteners 135 and 140 are tightened, the leg ends 165 contact and force the first side 95 toward the U-shaped end 145 further compressing the dead end 30 of the wire rope 20. However, leg ends 165 engaging the first side 95 prevent the second saddle 60 and the contoured surface 120 from frictionally engaging the live section 160 of the wire rope 20. The second passageway 130, as shown in FIG. 6, formed by the contoured surface 120, the U-bolt 40 and the first side 95 provide a sufficient area for free movement vertically and rotationally of the live section 160 of the wire rope 20. As can be seen in FIG. 5, the U-bolt 40 compresses the dead end 30 of the wire rope 20 such that there is a compression in the wire rope 20. However, it can be clearly seen that the wire rope 20 passes in a straight line through the second passageway 130 thereby indicating that the live section 160 of the wire rope 20 is not impeded from free movement either vertically or rotationally.

As indicated earlier, if the wedge socket 35 allows slippage while securing the wire rope 20, the live section 160 will slide freely though the second passageway 130. In the meantime, the dead end 30 of the wire rope 20 will move toward the wedge socket 35 along with the entire double saddle clamp 15 until the double saddle clamp 15 is forced into contact with the wedge socket 35, thereby preventing further movement of the wire rope 20 through the wedge socket 35.

Further, it can be seen in FIGS. 2, 4 and 5 that the dead end 30 of the wire rope 20 is held securely such that the dead end 30 cannot flop around freely, causing wear and abrasion at point 170 of the wedge socket 35 as shown in FIG. 5. The dead end 30 of the wire rope 20 is prevented from whipping and twisting such that it is held securely without the potential frictional movement which can cause early failure and dangerous conditions.

The foregoing is considered as illustrative only of the principles of the invention. Further, since numerous modifications and changes will readily occur to those skilled in the art, it is not desired to limit the invention to the exact construction and operation shown and described. Therefore, all suitable modifications and equivalents fall within the scope of the invention.

I claim:

1. A cable restraining device for a cable having a live end and a dead end and a length extending between the live end and the dead end, the device comprising:
   a. a U-bolt having a pair of legs and a bight portion connecting the legs;
   a first body having extending therethrough the legs of the U-bolt, the first body defining a channel located between the legs of the U-bolt and housing a first portion of the cable adjacent the dead end, the bight portion of the U-bolt engaging the first portion of the cable for preventing movement of a dead end of the cable relative to the first body;
   a second body engaging the first body and having extending therethrough the legs of the U-bolt, the second body defining a second channel located between the legs of the U-bolt and housing a second portion of the cable for affording vertical and rotational movement of the second portion of the cable relative to the second body; and
   d. at least one fastener attached to at least one of the threaded legs of the U-bolt.

2. The device of claim 1, wherein the at least one fastener comprises at least one threaded nut.

3. The device of claim 2, wherein the at least one fastener comprises two threaded nuts.

4. The device of claim 1, wherein the first body comprises a first saddle clamp.

5. The device of claim 4, wherein the second body comprises a second saddle clamp.

6. The device of claim 5, wherein the first saddle clamp has a contour surface for frictionally engaging the cable.

7. The device of claim 5, wherein the second saddle clamp has a plurality of legs for providing the second channel and for engaging the first saddle friction clamp.

8. The device of claim 7, wherein the first saddle clamp has at least one aperture for engaging the U-bolt.

9. The device of claim 8, wherein the second saddle clamp has at least one orifice for engaging the U-bolt.

10. A cable clamping device for restraining a length of cable, the device comprising:
   a. A U-shaped bolt having a first leg and a second leg;
   b. a first saddle clamp having at least one aperture for receiving the first leg of the U-shaped bolt, the first saddle clamp engaging a portion of the cable to prevent movement of the cable relative to the first saddle clamp;

c. a second saddle clamp having at least one aperture for receiving the first leg of the U-shaped bolt, the second saddle clamp having a plurality of legs defining therebetween a channel having an open side, the first saddle clamp overlying the open side of the channel, the first and second saddle clamps encompassing a second portion of the cable housed by the channel and affording movement of the second portion of the cable relative to the first and second saddle clamp; and d. a plurality of fasteners attached to the legs of the U-shaped bolt.

11. The device of claim 10, wherein the fasteners comprise a plurality of threaded nuts.

12. A cable restraining device for a cable, the cable having a live section, a dead end, and a length extending between the live section and the dead end, the device comprising:

a. a U-bolt having a pair of legs and a bight portion connecting the legs;

b. a first body having extending therethrough the legs of the U-bolt, the first body defining a channel located between the legs of the U-bolt and housing a first portion of the cable adjacent the dead end;

c. a second body having extending therethrough the legs of the U-bolt, the second body defining a second channel located between the legs of the U-bolt and housing a second portion of the cable, the first and second bodies and the bight portion of the U-bolt engaging the first portion of the cable for preventing movement of the dead end of the cable relative to the first body to provide an exposed loop of cable extending from the first body and into the second body; and d. at least one fastener attached to one of the threaded legs of the U-bolt.

* * * * *

UNITED STATES PATENT AND TRADEMARK OFFICE
CERTIFICATE OF CORRECTION

PATENT NO. : 5,427,469
DATED      : June 27, 1995
INVENTOR(S) : Timothy G. Galarnyk It is certified that error appears in the above-identified patent and that said Letters Patent are hereby corrected as shown below:

Column 6, line 29, before "a" insert -- b. --

Column 6, line 36, before "a" insert -- c. --

Column 6, line 58, delete the first occurrence of "friction" after "saddle".

Signed and Sealed this

Twelfth Day of September, 1995

Attest:

BRUCE LEHMAN

Attesting Officer      Commissioner of Patents and Trademarks